(12) United States Patent
Byun

(10) Patent No.: US 10,698,810 B2
(45) Date of Patent: Jun. 30, 2020

(54) MEMORY SYSTEM AND OPERATING METHOD THEREOF

(71) Applicant: SK hynix Inc., Gyeonggi-do (KR)

(72) Inventor: Eu-Joon Byun, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 0 days.

(21) Appl. No.: 16/040,167

(22) Filed: Jul. 19, 2018

(65) Prior Publication Data

US 2019/0196957 A1    Jun. 27, 2019

(30) Foreign Application Priority Data

Dec. 26, 2017  (KR) .................. 10-2017-0179892

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01); *G06F 3/0608* (2013.01); *G06F 3/0631* (2013.01); *G06F 3/0652* (2013.01); *G06F 3/0679* (2013.01); *G06F 12/0253* (2013.01); *G06F 12/0292* (2013.01); *G06F 2212/7201* (2013.01); *G06F 2212/7205* (2013.01)

(58) Field of Classification Search
None
See application file for complete search history.

(56) References Cited

U.S. PATENT DOCUMENTS

| | | | |
|---|---|---|---|
| 8,224,795 B2* | 7/2012 | Nomura | G01C 21/367 707/694 |
| 2016/0011790 A1 | 1/2016 | Rostoker et al. | |
| 2017/0371922 A1* | 12/2017 | Warrier | H04W 12/08 |
| 2018/0336104 A1* | 11/2018 | Koo | G06F 11/1458 |
| 2019/0146907 A1* | 5/2019 | Frolikov | G06F 3/064 711/103 |

FOREIGN PATENT DOCUMENTS

| | | |
|---|---|---|
| KR | 1020130142103 | 12/2013 |
| KR | 1020150037364 | 4/2015 |

* cited by examiner

*Primary Examiner* — Brian R Peugh
(74) *Attorney, Agent, or Firm* — IP & T Group LLP

(57) ABSTRACT

A memory system includes: a memory device suitable for storing target map data; and a controller suitable for controlling the memory device, wherein the controller includes: an address management component suitable for establishing a plurality of indexes, one index for each of a plurality of map data; and a processor suitable for: reading the target map data from the memory device; and storing the target map data into a target map block of the memory device, wherein the target map block is determined according to the indexes.

17 Claims, 13 Drawing Sheets

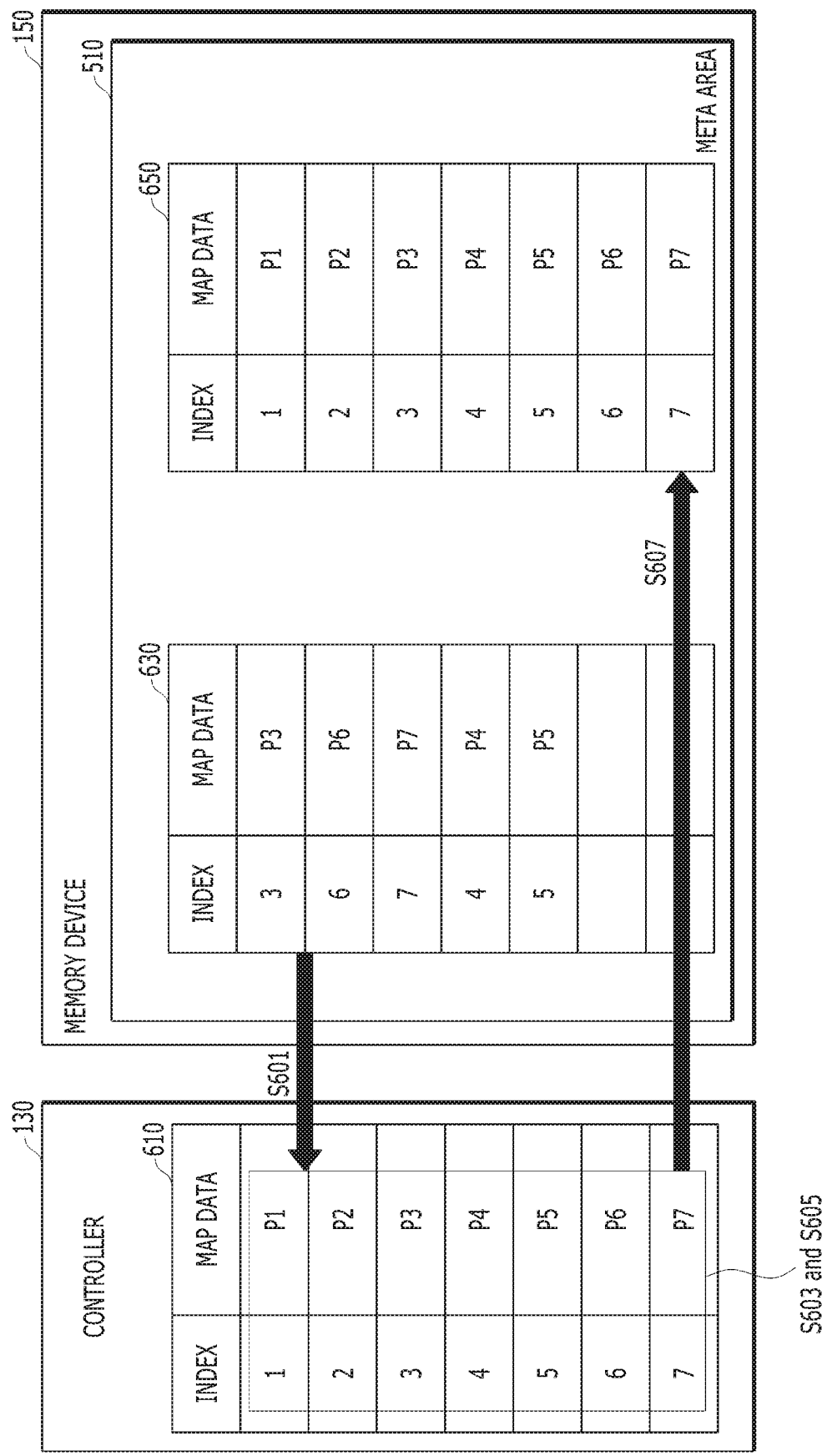

MEMORY SYSTEM AND OPERATING METHOD THEREOF

CROSS-REFERENCE TO RELATED APPLICATION(S)

The present application claims priority under 35 U.S.C. § 119(a) to Korean Patent Application No. 10-2017-0179892, filed on Dec. 26, 2017, the disclosure of which is incorporated herein by reference in its entirety.

BACKGROUND

1. Field

Various embodiments of the present invention generally relate to an electronic device. Particularly, the embodiments relate to a memory system capable of processing efficiently data and an operating method thereof.

2. Description of the Related Art

The computer environment paradigm has shifted to ubiquitous computing systems that can be used anytime and anywhere. As a result, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems may provide excellent stability, durability, high information access speed, and low power consumption because they have no moving parts as compared with a hard disk device. Examples of memory systems having such advantages include universal serial bus (USB) memory devices, memory cards having various interfaces, and solid state drives (SSD).

SUMMARY

Various embodiments are directed to a memory system capable of using indexes, each corresponding to a respective one of plural map data, to effectively perform read and garbage collection operations regarding the plural map data, so as to improve performance of a memory system and an operating method thereof.

In accordance with an embodiment of the present invention, a memory system may include: a memory device suitable for storing target map data; and a controller suitable for controlling the memory device, wherein the controller includes: an address management component suitable for establishing a plurality of indexes, one index for each of a plurality of map data; and a processor suitable for: reading the target map data from the memory device; and storing the target map data into a target map block of the memory device, wherein the target map block is determined according to the indexes.

In accordance with an embodiment of the present invention, an operating method of a memory system may include: establishing, using a controller, a plurality of indexes, one index for each of a plurality of map data; controlling a memory device to read stored target map data from the memory device; and controlling the memory device to store the target map data into a target map block, which is determined according to the indexes, of the memory device.

In accordance with an embodiment of the present invention, a memory system may include: a memory device suitable for storing a plurality of map data and a location table identifying locations of the plurality of map data; and a controller suitable for generating indexes, each index corresponding to a respective one of the plurality of map data, and loading and updating at least one of the plurality of map data based on the indexes, wherein the controller is configured to use the indexes for sorting the plurality of map data and updating the location table, and to check the indexes for generating a new index for a map data having no corresponding index.

BRIEF DESCRIPTION OF THE DRAWINGS

FIG. 6B is a diagram schematically illustrating an operation of the controller shown in FIG. 6A in accordance with an embodiment of the present invention.

DETAILED DESCRIPTION

Figure 1:
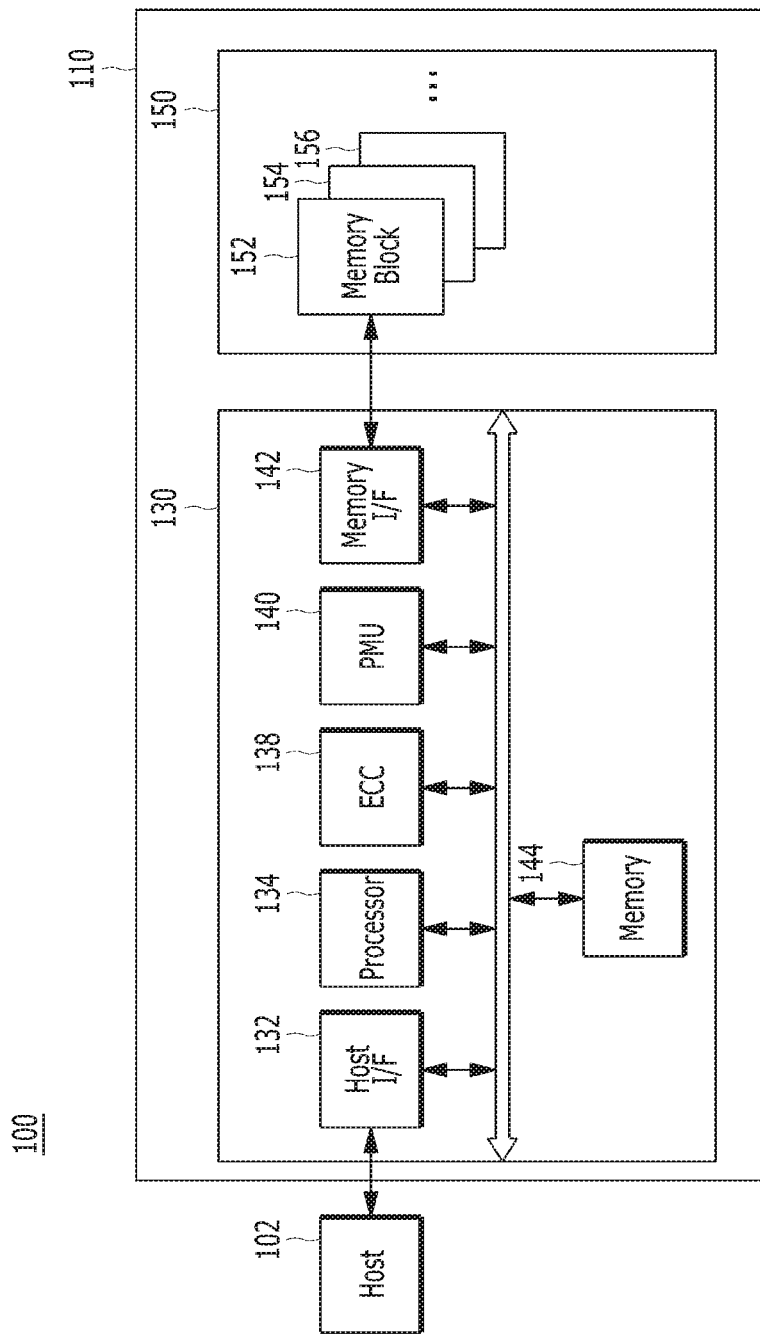
FIG. 1 is a block diagram illustrating a data processing system including a memory system, in accordance with an embodiment of the present invention.

Various embodiments of the present invention are described below in more detail with reference to the accompanying drawings. It is noted, however, that the present invention may be embodied in different forms including variations of the disclosed embodiments. Thus, the invention is not limited to the embodiments set forth herein. Rather, the described embodiments are provided so that this disclosure is thorough and complete and fully conveys the present invention to those skilled in the art to which this invention pertains. Throughout the disclosure, like reference numerals refer to like parts throughout the various figures and embodiments of the present invention. Also, throughout the disclosure, reference to "an embodiment" or the like is not necessarily to only one embodiment, and different references to "an embodiment" or the like are not necessarily to the same embodiment(s).

It will be understood that, although the terms "first", "second", "third", and the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale, and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via one or more intervening elements.

In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

By way of example but not limitation, the host 102 may include a portable electronic device such as a mobile phone, an MP3 player, and a laptop computer or an electronic device such as a desktop computer, a game player, a TV, a projector, and the like.

The memory system 110 may operate in response to a request from the host 102. For example, the memory system 100 may store data to be accessed and read by the host 102. The memory system 110 may be used as a main memory system or an auxiliary memory system of the host 102. The memory system 110 may be implemented with any one of various types of storage devices, which may be electrically coupled with the host 102. The memory system 110 may communicate with the host 102 according to a protocol of a host interface. Non-limiting examples of suitable storage devices include a solid state drive (SSD), a multimedia card (MMC), an embedded MMC (eMMC), a reduced size MMC (RS-MMC) and a micro-MMC, a secure digital (SD) card, a mini-SD and a micro-SD, a universal serial bus (USB) storage device, a universal flash storage (UFS) device, a compact flash (CF) card, a smart media (SM) card, a memory stick, and the like.

The storage devices for the memory system 110 may be implemented with a volatile memory device, such as a dynamic random access memory (DRAM) and a static RAM (SRAM), as well as with a nonvolatile memory device such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM) and a flash memory.

The memory system 110 may include a memory device 150, which stores data to be accessed by the host 102, and a controller 130 which may control storage of data in the memory device 150.

In an example, the controller 130 and the memory device 150 may be integrated into a single semiconductor device, which may be included in the various types of memory systems as exemplified above.

By way of example but not limitation, the memory system 110 may be configured as a part of a computer, an ultra-mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation system, a black box, a digital camera, a digital multimedia broadcasting (DMB) player, a 3D television, a smart television, a digital audio recorder, a digital audio player, a digital picture recorder, a digital picture player, a digital video recorder, a digital video player, a storage constituting a data center, a device capable of transmitting and receiving information under a wireless environment, one of various electronic devices establishing or constituting a home network, one of various electronic devices establishing or constituting a wired or wireless computer network, one of various electronic devices establishing or constituting a telematics network, a radio frequency identification (RFID) device, or one of various component elements which constitute a computing system.

The memory device 150 may be a nonvolatile memory device and may retain data stored therein even though power is not supplied. The memory device 150 may store data provided from the host 102 through a write operation, and output data stored therein to the host 102 through a read operation. The memory device 150 may include a plurality of memory blocks 152 to 156, each of which may include a plurality of pages. Each of the pages may include a plurality of memory cells to which a plurality of word lines WL are electrically coupled.

The controller 130 may control overall operations of the memory device 150, such as read, write, program, and erase operations. By way of example but not limitation, the controller 130 of the memory system 110 may control the memory device 150 in response to a request delivered from the host 102. The controller 130 may provide the data, read from the memory device 150, to the host 102, and/or may store the data, transmitted from the host 102, into the memory device 150.

The controller 130 may include a host interface (I/F) 132, a processor 134, an error correction code (ECC) component 138, a power management unit (PMU) 140, a memory interface I/F 142 such as a NAND flash controller (NFC), and a memory 144. Each of components may be electrically coupled to, or operatively engaged with, each of the other components via an internal bus.

The host interface 132 may process commands and data provided from the host 102, and may communicate with the host 102 through at least one of various interface protocols such as universal serial bus (USB), multimedia card (MMC), peripheral component interconnect-express (PCI-E), small computer system interface (SCSI), serial-attached SCSI (SAS), serial advanced technology attachment (SATA), parallel advanced technology attachment (DATA), small computer system interface (SCSI), enhanced small disk interface (ESDI) and integrated drive electronics (IDE).

The ECC component 138 may detect and correct errors in the data read from the memory device 150 during the read operation. The ECC component 138 may not correct error bits when the number of the error bits is greater than or equal to a threshold number of correctable error bits. If not correcting error bits, the ECC component 138 may output an error correction fail signal indicating failure in correcting the error bits.

The ECC component 138 may perform an error correction operation based on at least a coded modulation such as a low density parity check (LDPC) code, a Bose-Chaudhuri-Hocquenghem (BCH) code, a turbo code, a Reed-Solomon (RS) code, a convolution code, a recursive systematic code (RSC), a trellis-coded modulation (TCM), a Block coded modulation (BCM), and/or other suitable error correction techniques. As such, the ECC component 138 may include all circuits, modules, systems, or devices configured to perform the error correction operation.

The PMU 140 may provide and manage power of the controller 130.

The memory interface 142 may serve as a memory/storage interface between the controller 130 and the memory device 150 to allow the controller 130 to control the memory device 150 in response to a request from the host 102. The memory interface 142 may generate a control signal for the memory device 150 and process data to be provided to the memory device 150 under the control of the processor 134 when the memory device 150 is a flash memory and, in particular, when the memory device 150 is a NAND flash memory. It is noted that the present invention is not limited to NAND flash memory/NAND flash interface, and that a suitable memory/storage interface may be selected depending upon the type of the memory device 150.

The memory 144 may serve as a working memory of the memory system 110 and the controller 130, and store data for operations of the memory system 110 and the controller 130. The controller 130 may control the memory device 150 in response to a request from the host 102. The controller 130 may provide data, read from the memory device 150, to the host 102, and may store data, provided from the host 102, into the memory device 150. The memory 144 may store data, required by the controller 130 and the memory device 150, to perform these operations.

The memory 144 may be implemented with a volatile memory. The memory 144 may be implemented with a static random access memory (SRAM) or a dynamic random access memory (DRAM). Although FIG. 1 shows the memory 144 inside controller 130, it is for illustrative purposes only; the present disclosure is not limited to that arrangement. That is, the memory 144 may be disposed within or external to the controller 130. In another example, the memory 144 may be embodied by an external volatile memory having a memory interface for transferring data between the memory 144 and the controller 130.

The processor 134 may control the overall operations of the memory system 110. The processor 134 may use firmware, which may be referred to as a flash translation layer (hi L), to control general operations of the memory system 110. The FTL may be used as an interface between the host 102 and the memory device 150. The host 102 may request write and read operations, which may be executed through the FTL, to the memory device 150.

The FTL may manage operations of address mapping, garbage collection, wear-leveling, and so forth. Particularly, the FTL may store map data. Therefore, the controller 130 may map a logical address, which is provided from the host 102, to a physical address of the memory device 150 based on the map data. The memory device 150 may perform an operation like a general device because of the address mapping operation. When the controller 130 updates data of a particular page, the controller 130 may use an address mapping operation based on the map data to program new data into another empty page and may invalidate old data of the particular page due to a characteristic of a flash memory device. Further, the controller 130 may store map data of the new data into the FTL.

The processor 134 may be implemented with a microprocessor or a central processing unit (CPU). The memory system 110 may include one or more processors 134.

A management unit (not shown) may be included in the processor 134, and may perform bad block management of the memory device 150. The management unit may find bad memory blocks included in the memory device 150, which are in unsatisfactory condition for further use, and may perform bad block management on the bad memory blocks. When the memory device 150 is a flash memory such as a NAND flash memory, a program failure may occur during the write operation (i.e., during the program operation), due to characteristics of a NAND logic function. During the bad block management, the data in the program-failed memory block or the bad memory block may be programmed into a new memory block. Also, the bad blocks, generated due to the program fail, may seriously deteriorate the utilization efficiency of the memory device 150 having a 3D stack structure and the reliability of the memory system 100, and thus reliable bad block management is needed.

Figure 2:
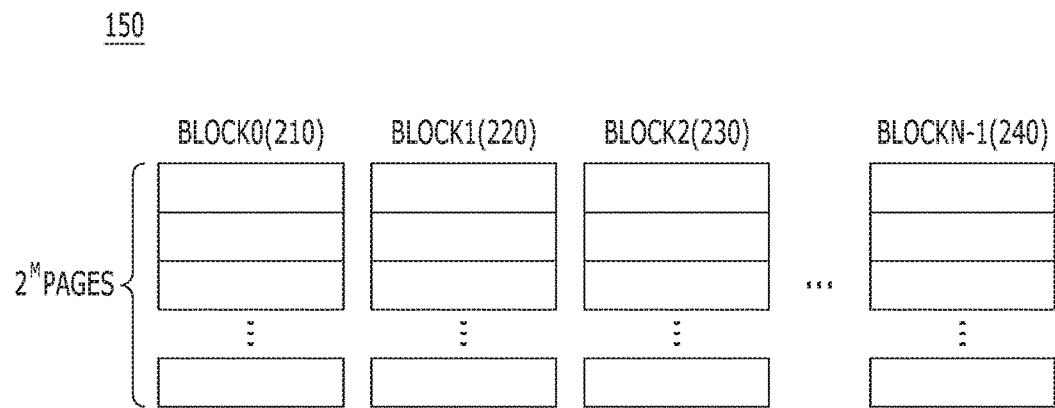
FIG. 2 is a schematic diagram illustrating an exemplary configuration of a memory device employed in the memory system shown in FIG. 1.

FIG. 2 is a schematic diagram illustrating the memory device 150 of FIG. 1.

Referring to FIG. 2, the memory device 150 may include the plurality of memory blocks BLOCK 0 to BLOCKN−1, and each of the blocks BLOCK 0 to BLOCKN−1 may include a plurality of pages, for example, $2^M$ pages, the number of which may vary according to circuit design. The memory device 150 may include a plurality of memory blocks, such as single level cell (SLC) memory blocks and/or multi-level cell (MLC) memory blocks classified according to the number of bits which may be stored or expressed in a single memory cell. The SLC memory block may include a plurality of pages which are implemented with memory cells, each capable of storing 1-bit data. The MLC memory block may include a plurality of pages which are implemented with memory cells, each capable of storing multi-bit data, e.g., at least two bit data. An MLC memory block including a plurality of pages which are implemented with memory cells, each capable of storing 3-bit data, may be defined as a triple level cell (TLC) memory block.

Each of the plurality of memory blocks 210 to 240 may store the data provided from the host device 102 during a write operation, and may output stored data to the host 102 during a read operation.

Figure 3:
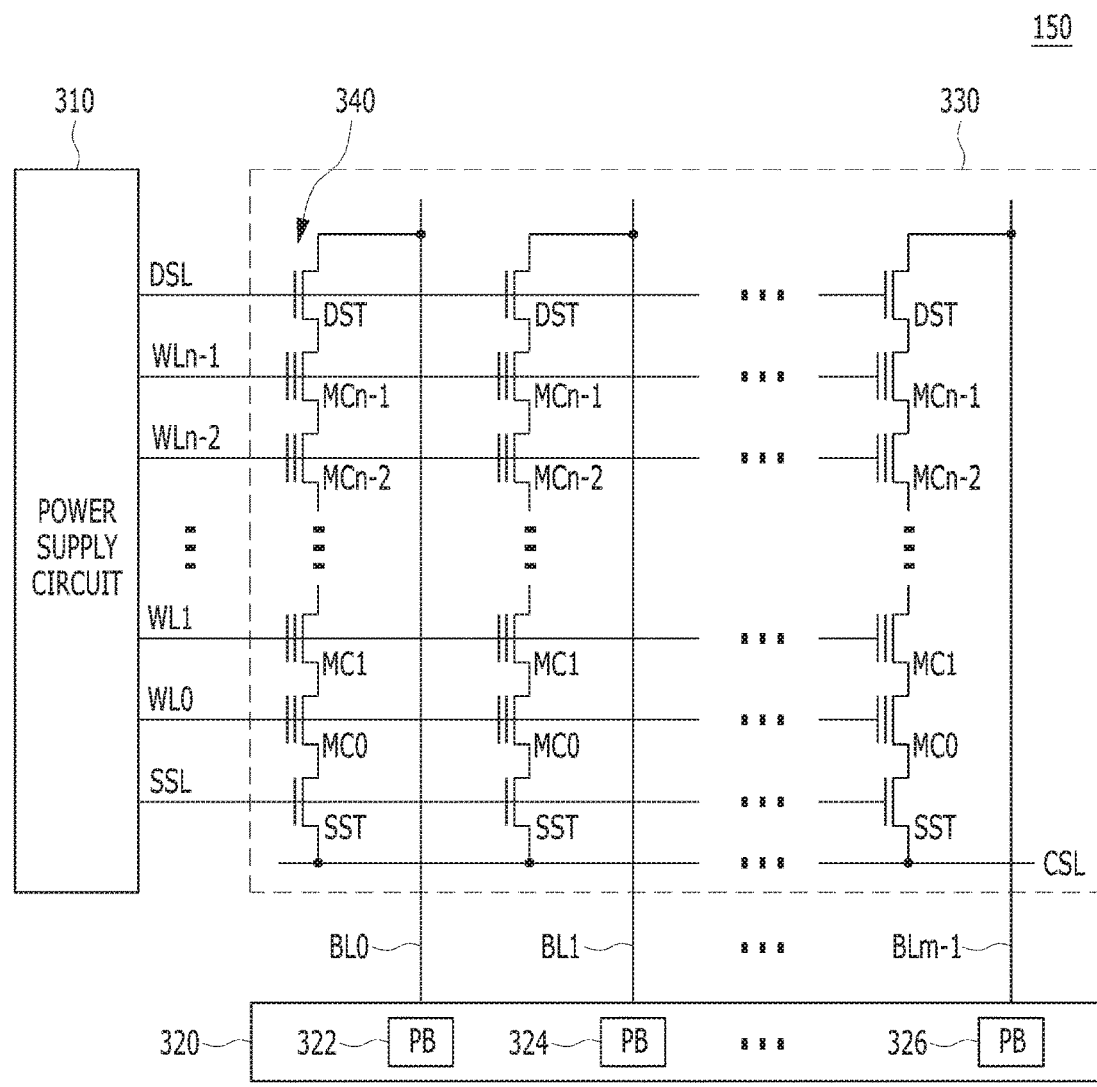
FIG. 3 is a circuit diagram illustrating an exemplary configuration of a memory cell array of a memory block in the memory device shown in FIG. 2.

FIG. 3 is a circuit diagram illustrating a memory block 330 in the memory device 150 of FIGS. 1 and 2.

Referring to FIG. 3, the memory block 330 may correspond to any of the plurality of memory blocks 152 to 156 shown in FIG. 1.

Referring to FIG. 3, the memory block 330 of the memory device 150 may include a plurality of cell strings 340 which are electrically coupled to bit lines BL0 to BLm−1, respectively. The cell string 340 of each column may include at least one drain select transistor DST and at least one source select transistor SST. A plurality of memory cells or a plurality of memory cell transistors MC0 to MCn−1 may be electrically coupled in series between the select transistors DST and SST. The respective memory cells MC0 to MCn−1 may be configured by single level cells (SLC), each storing 1 bit of information, and/or by multi-level cells (MLC), each storing multi-bit data. The strings 340 may be electrically coupled to the corresponding bit lines BL0 to BLm−1, respectively. For reference, in FIG. 3, 'DSL' denotes a drain select line, 'SSL' denotes a source select line, and 'CSL' denotes a common source line.

While FIG. 3 only shows, as an example, the memory block 330 configured by NAND flash memory cells, it is noted that the memory block 330 of the memory device 150 is not limited to NAND flash memory. The memory device 150 may be realized by a NOR flash memory, a hybrid flash memory in which at least two kinds of memory cells are combined, or an one-NAND flash memory in which a controller is built in a memory chip. The operations of the above-described semiconductor device may be applicable not only to a flash memory device in which a charge storing layer is configured by conductive floating gates but also to a charge trap flash (CTF) in which a charge storing layer is configured by a dielectric layer.

A power supply circuit 310 of the memory device 150 may generate word line voltages, for example, a program voltage, a read voltage and a pass voltage, which may be selectively supplied to word lines according to an operation mode, as well as generate voltages to be supplied to bulks. The bulks may include well regions in which the memory cells are formed. The power supply circuit 310 may perform a voltage generating operation under the control of a control circuit (not shown). The power supply circuit 310 may generate a plurality of variable read voltages for outputting a plurality of read data, a voltage for selecting one of the memory blocks or sectors of a memory cell array under the control of the control circuit, a word line voltage for selecting one of the word lines of the selected memory block. The power supply circuit 310 may provide different word line voltages to the selected word line and unselected word lines.

A read/write circuit 320 of the memory device 150 may be controlled by the control circuit, and may serve as a sense amplifier or a write driver in response to an operation mode. For example, during a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and supply to bit lines a voltage or a current determined according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Figure 4:
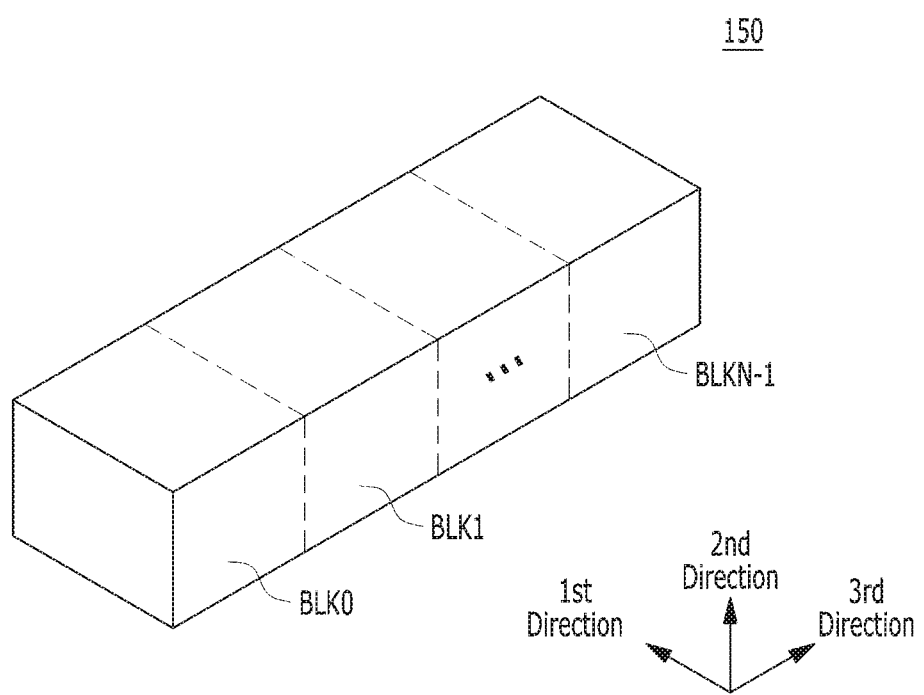
FIG. 4 is a schematic diagram illustrating an exemplary three-dimensional structure of the memory device shown in FIG. 2.

FIG. 4 is a schematic diagram illustrating a three-dimensional (3D) structure of the memory device 150 of FIGS. 1 and 2.

The memory device 150 may be embodied by a two-dimensional (2D) or a three-dimensional (3D) memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1, each having a 3D structure (or vertical structure).

The memory device may include a meta-region suitable for storing map data and a user region suitable for storing user data. The controller may periodically store or update the map data into the memory device. The controller may read target map data, which is a target of the update, from the memory device according to a location table. The location table may include location information of the target map data. The location table may be stored in the memory. The controller may keep all of the map data as well as the read target map data up-to-date by checking all of the map data stored in the memory device. The controller may store the updated map data into the memory device again. Also, the controller may update the location table in order to change location of the map data. The controller may periodically perform the above described process at, for example, regularly occurring intervals.

When a number of invalid map data, among the map data stored in the meta-region, becomes greater than a predetermined or set threshold, as the map data is continuously written into the meta-region, the controller may perform a garbage collection operation to the map data. While performing a garbage collection operation to the map data, valid map data may be copied into an open memory block in the meta-region.

The map data may be randomly distributed in the meta-region due to the repeated map update operation and the garbage collection operation. As the random distribution range of the map data increases, it may take more time to search the map data and thus the read operation performance of the controller may be degraded. In accordance with an embodiment of the present invention, a controller may sequentially store the map data into the meta-region according to a reference and an operating method thereof.

Figure 5:
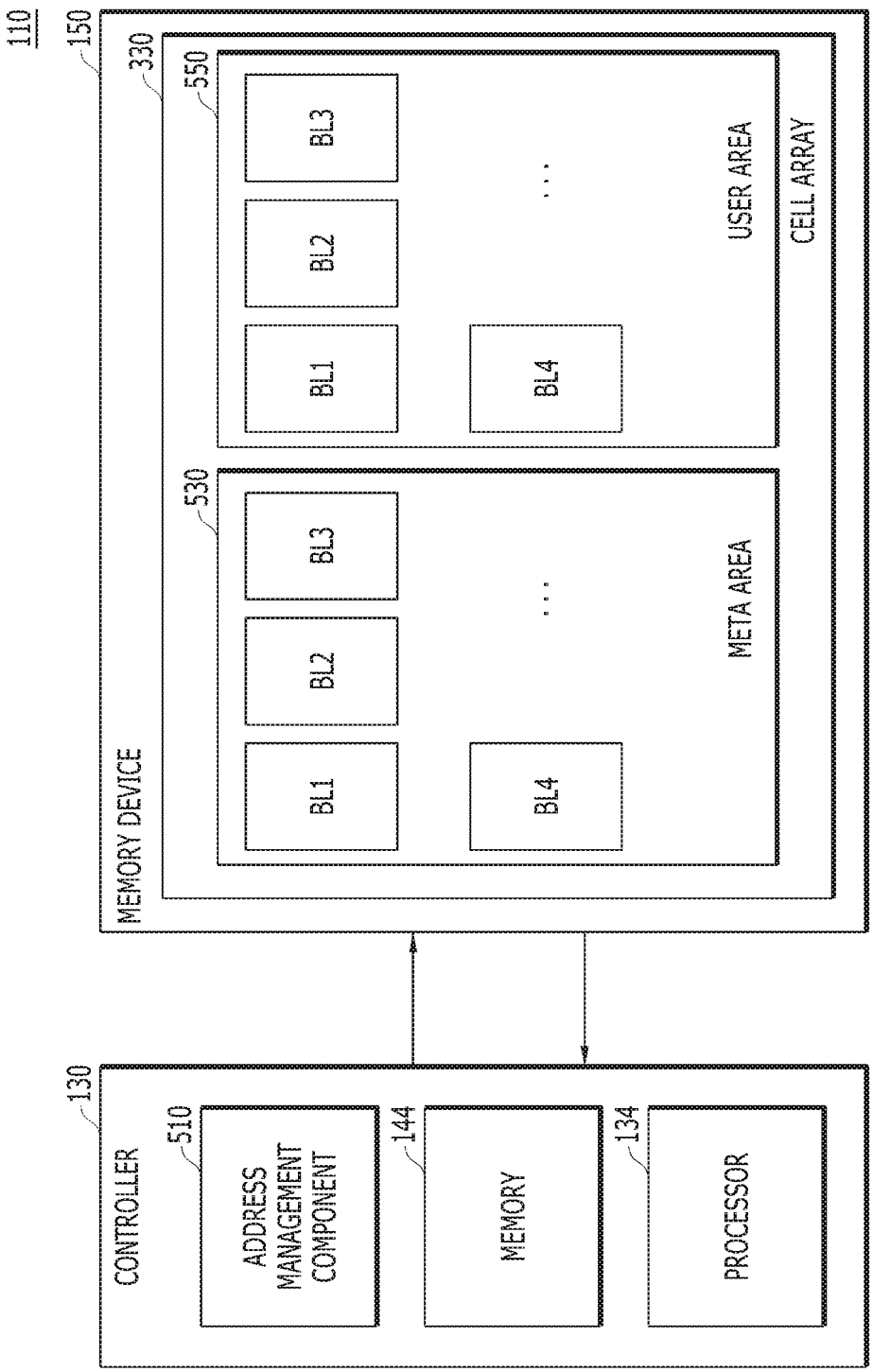
FIG. 5 is a diagram schematically illustrating a structure of the memory system in accordance with an embodiment of the present invention.

FIG. 5 is a diagram schematically illustrating a structure of the memory system 110 in accordance with an embodiment of the present invention. Referring to FIG. 5, the memory system 110 may include the controller 130 and the memory device 150.

The memory device 150 may include a meta-region 530 suitable for storing map data and a user region 550 suitable for storing user data. The memory cell array 330 including a plurality of memory blocks may be divided into the meta-region 530 and the user region 550. Each of the meta-region 530 and the user region 550 may include a plurality of memory blocks. Memory blocks included in the meta-region 530 may be referred to as map blocks, and memory blocks included in the user region 550 may be referred to as user blocks.

Referring to FIG. 5, the controller 130 may include the memory 144 and the processor 134, and may further include an address management component 510.

The address management component 510 may manage an index table having indexes respectively corresponding to the map data. The address management component 510 may set respective indexes to represent the respective map data in the index table. The index table may have physical addresses respectively corresponding to user data stored in the memory device 150 and the indexes respectively corresponding to the physical addresses. The index table may be managed in units of memory blocks and may be stored in the memory device 150, as well as in the address management component 510. The address management component 510 may generate the index table based on both the map data stored in the map blocks and the map data corresponding to the user data stored in the user blocks. The address management component 510 may generate a new index corresponding to a physical address, which is not yet included in the index table.

The processor 134 may periodically update the map data stored in the meta-region 530. The processor 134 may control the memory device 150 to read target map data, which is a target of the map update, from the user blocks into the memory 144 according to the location table stored in the memory 144. The processor 134 may update all of the map data including the target map data and remaining map data stored in the meta-region 530. The processor 134 may identify the index of the target map data based on the index table generated by the address management component 510. The processor 134 may sort the map data stored in the map blocks according to their indexes. When there is no index corresponding to the target map data, the address management component 510 may generate an index corresponding to the target map data. The processor 134 may store the target map data into the map blocks, which are sorted according to the indexes. The controller 130 may update the location table in order to change the location of the target map data.

The processor 134 may control the memory device 150 to periodically perform a garbage collection operation to the map blocks of the meta-region 530. The processor 134 may select as a victim map block a map block having a smaller number of valid map pages than a predetermined or set threshold in the meta-region 530. The valid map page may store valid map data. The processor 134 may control the memory device 150 to copy the valid map data stored in the selected victim map block into an open map block. The processor 134 may identify the index corresponding to the valid map data based on the index table stored in the address management component 510, and may sort open map blocks according to the indexes. The processor 134 may store the valid map data into the open map blocks sorted according to the indexes.

Figure 6A:
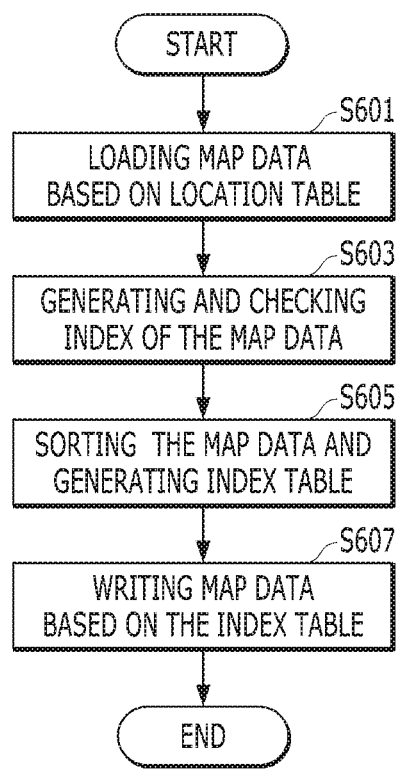
FIG. 6A is a flowchart illustrating an operation of the controller in accordance with an embodiment of the present invention.

FIG. 6A is a flowchart illustrating an operation of the controller 130 in accordance with an embodiment of the present invention. FIG. 6A schematically shows the map update operation of the controller 130.

At step S601, the processor 134 may control the memory device 150 to read the target map data from the user blocks into the memory 144 according to the location table stored in the memory 144. The processor 134 may control the memory device 150 to read map data from a map block, which stores a target of the update, into the memory 144.

At step S603, the address management component 510 may identify the index corresponding to the target map data based on the index table. The address management component 510 may generate a new index for map data, an index corresponding to which is not generated.

At step S605, the address management component 510 may generate an index table by sorting map data read according to corresponding indexes.

At step S607, the processor 134 may control the memory device 150 to store map data into the map blocks according to the index table.

FIG. 6B is a diagram schematically illustrating an operation of the controller 130 shown in FIG. 6A in accordance with an embodiment of the present invention. FIG. 6B shows that the controller 130 controls the memory device 150 to store the map data into the map blocks according to the index table 610. In this example, the target map data are map data P1 and P2.

Referring to step S601 of FIG. 6A, the processor 134 may control the memory device 150 to read the target map data P1 and P2 from the user blocks into the memory 144 according to the location table (not illustrated) stored in the memory 144. The processor 134 may control the memory device 150 to read the map data as a target of the update from the map blocks.

Referring to steps S603 and S605 of FIG. 6A, when there is no index corresponding to the map data P1 and P2 read from the user blocks, the address management component 510 may set an index corresponding to each of the map data P1 and P2 read from the user blocks. The address management component 510 may sort map data read respectively from the user blocks and the map blocks according to corresponding indexes, and may generate an index table for the sorted map data.

For example, the address management component 510 may sort map data P3 to P7, which are randomly stored in the map block 630, and simultaneously may generate the index table 610 in which the target map data P1 and P2 are sorted according to corresponding indexes. When the address management component 510 has already generated and stored the index table for the map data, the address management component 510 may update the existing index table.

Referring to step S607, the processor 134 may control the memory device 150 to store the map data into the map block 650 according to the index table 610.

Figure 7A:
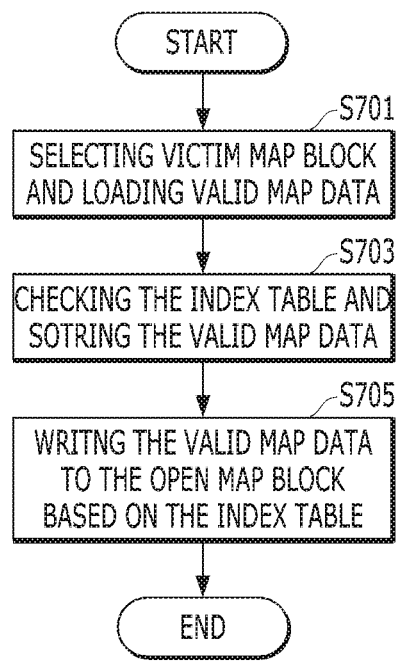
FIG. 7A is a flowchart illustrating an operation of the controller in accordance with an embodiment of the present invention.

FIG. 7A is a flowchart illustrating an operation of the controller 130 in accordance with an embodiment of the present invention. FIG. 7A schematically shows the garbage collection operation of the controller 130.

At step S701, the processor 134 may select a victim map block based on a number of valid map pages. The processor 134 may select as the victim map block a map block having a smaller number of valid map pages than a predetermined or set threshold. The processor 134 may control the memory device 150 to read the valid map data from the victim map block.

At step S703, the address management component 510 may identify the index of the valid map data based on the index table 610. The address management component 510 may sort the read valid map data according to the corresponding index.

At step S705, the processor 134 may control the memory device 150 to store the valid map data into an open map block according to the index table 610.

Figure 7B:
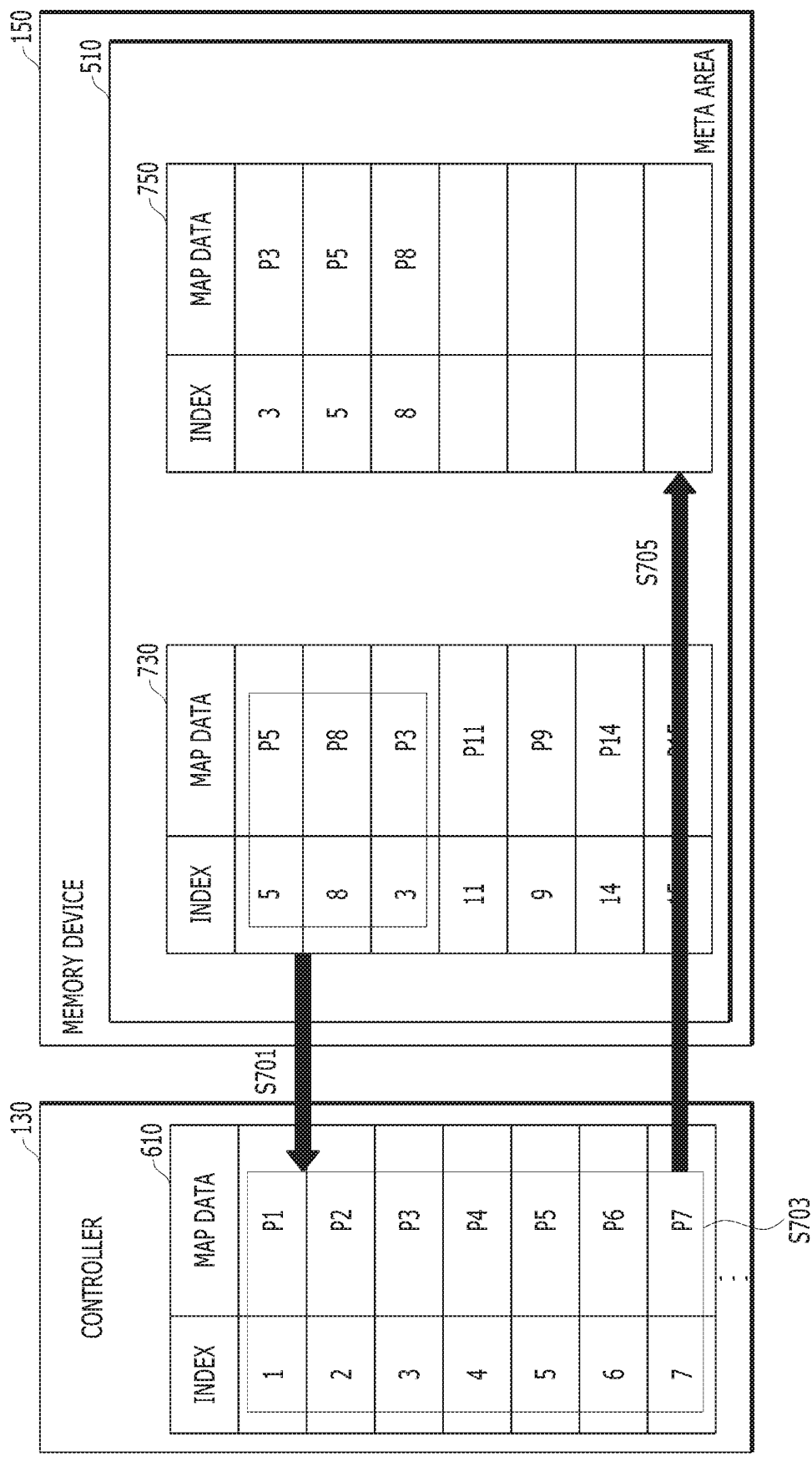
FIG. 7B is a diagram schematically illustrating an operation of the controller shown in FIG. 7A in accordance with an embodiment of the present invention.

FIG. 7B is a diagram schematically illustrating an operation of the controller 130 shown in FIG. 7A. FIG. 7B shows that the controller 130 controls the memory device 150 to store the valid map data into an open map block according to the index table 610. In this example, the valid map data are map data P3, P5 and P8.

Referring to step S701 of FIG. 7A, the processor 134 may select as a victim map block a map block 730 having 2 valid map pages in which valid map data is stored.

Referring to step S703 of FIG. 7A, the processor 134 pray identify the valid map data P3, P5 and P8 based on the index table 610. The processor 134 may control the memory device 150 to read the valid map data P3, P5 and P8. The address management component 510 may identify the indexes 3, 5 and 8 respectively corresponding to the valid map data P3, P5 and P8 based on the index table 610. The address management component 510 may sort the read valid map data P3, P5 and P8 according to the corresponding indexes 3, 5 and 8.

Referring to step S705 of FIG. 7A, the processor 134 may control the memory device 150 to sequentially store the valid map data P3, P5 and P8 into an open map block 750 according to the corresponding indexes 3, 5 and 8 respectively corresponding to the valid map data P3, P5 and P8. Although not illustrated, when the valid map data P3, P5 and P8 are stored into the open map block 750, the processor 134 may control the memory device 150 to erase map data stored in the victim map block 730.

As described above, in accordance with an embodiment of the present invention, the controller 130 may sort and store the map data by using the index corresponding to the map data. Therefore, the controller 130 may efficiently perform a prefetch operation and may improve performance of a read operation for reading the map data, which is sorted according to the index.

FIGS. 8 to 16 are diagrams schematically illustrating exemplary applications of the data processing system of FIGS. 1 to 7B according to various embodiments.

Figure 8:
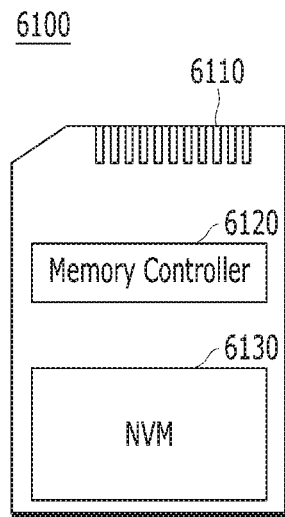
FIGS. 8 to 16 are diagrams schematically illustrating exemplary applications of a data processing system, in accordance with various embodiments of the present invention.

FIG. 8 is a diagram schematically illustrating an example of the data processing system including the memory system in accordance with an embodiment. FIG. 8 schematically illustrates a memory card system to which the memory system may be applied.

Referring to FIG. 8, the memory card system 6100 may include a memory controller 6120, a memory device 6130, and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and use firmware for controlling the memory device 6130. That is, the memory controller 6120 may correspond to the controller 130 of the memory system 110 described with reference to FIGS. 1 to 7B, and the memory device 6130 may correspond to the memory device 150 of the memory system 110 described with reference to FIGS. 1 to 7B.

Thus, the memory controller 6120 may include a RAM, a processor, a host interface, a memory interface and an error correction component. The memory controller 130 may further include the elements described in FIG. 1.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with an embodiment may be applicable to either wired/wireless electronic devices, particularly mobile electronic devices.

The memory device 6130 may be implemented by a nonvolatile memory. By way of example but not limitation, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM). The memory device 6130 may include a plurality of dies as in the memory device 150 of FIG. 1.

The memory controller 6120 and the memory device 6130 may be integrated into a single semiconductor device. For example, the memory controller 6120 and the memory device 6130 may form a solid state drive (SSD) by being integrated into a single semiconductor device. Also, the memory controller 6120 and the memory device 6130 may be so integrated to form a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and/or a universal flash storage (UFS).

Figure 9:
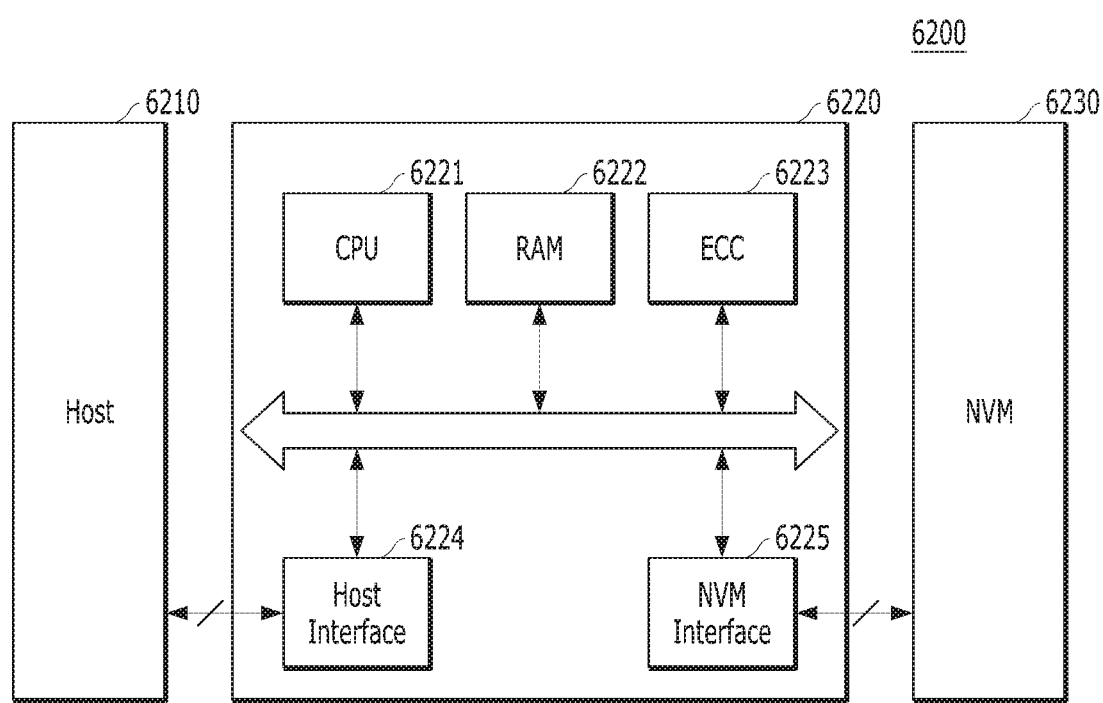

FIG. 9 is a diagram schematically illustrating an example of the data processing system including a memory system.

Referring to FIG. 9, the data processing system 6200 may include a memory device 6230 having one or more nonvolatile memories and a memory controller 6220 for controlling the memory device 6230. The data processing system 6200 illustrated in FIG. 9 may serve as a storage medium such as a memory card (CF, SD, micro-SD or the like) or USB device, as described with reference to FIG. 1. The memory device 6230 may correspond to the memory device 150 in the memory system 110 described in FIGS. 1 to 7B, and the memory controller 6220 may correspond to the controller 130 in the memory system 110 described in FIGS. 1 to 7B.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control the operations on the memory device 6230, for example, read, write, file system management and bad page management operations. The RAM 6222 may be operated according to control of the CPU 6221, and used as a work memory, a buffer memory or a cache memory. When the RAM 6222 is used as a work memory, data processed by the CPU 6221 may be temporarily stored in the RAM 6222. When the RAM 6222 is used as a buffer memory, the RAM 6222 may be used for buffering data either transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC component 138 of the controller 130 illustrated in FIG. 1. As described with reference to FIG. 1, the ECC circuit 6223 may generate an ECC (Error Correction Code) for correcting a fail bit or an error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit data to, or receive data from, the host 6210 through the host interface 6224, and may transmit data to, or receive data from, the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, e.g., the host 6210 or another external device, and exchange data with the external device. In particular, as the memory controller 6220 is configured to communicate with the external device through one or more of various communication protocols, the memory system and the data processing system in accordance with an embodiment may be applied to wired/wireless electronic devices, particularly a mobile electronic device.

Figure 10:
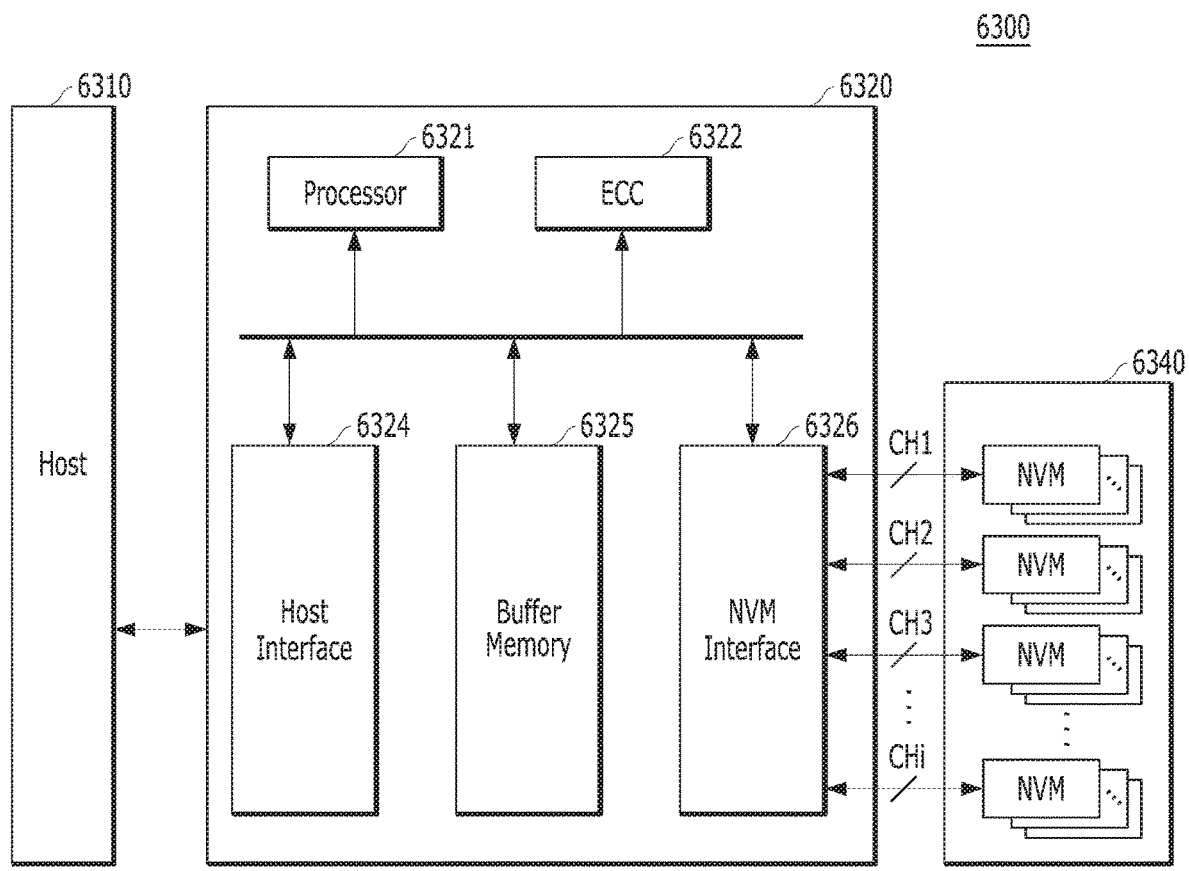

FIG. 10 is a diagram schematically illustrating an example of the data processing system including the memory system. FIG. 10 schematically illustrates an SSD to which the memory system may be applied.

Referring to FIG. 10, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface such as a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. By way of example, FIG. 10 illustrates that the buffer memory 6325 is embodied in the controller 6320. However, the buffer memory 6325 may be external to the controller 6320.

The ECC circuit 6322 may be configured to calculate an ECC value of data to be programmed to the memory device 6340 during a program operation, to perform an error correction operation on data read from the memory device 6340 based on the ECC value during a read operation, and to perform an error correction operation on data recovered from the memory device 6340 during a failed data recovery operation.

The host interface 6324 may provide an interface function with an external device, e.g., the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system such as RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may be configured to select one or more memory systems or SSDs 6300 according to a plurality of RAID levels, that is, RAID level information of the write command provided from the host 6310 in the SSDs 6300, and to output data corresponding to the write command to the selected SSDs 6300. Furthermore, when the RAID controller performs a read command in response to a read command provided from the host 6310, the RAID controller may be configured to select one or more memory systems or SSDs 6300 according to a plurality of RAID levels, that is, RAID level information of the read command provided from the host 6310 in the SSDs 6300, and to provide data read from the selected SSDs 6300 to the host 6310.

Figure 11:
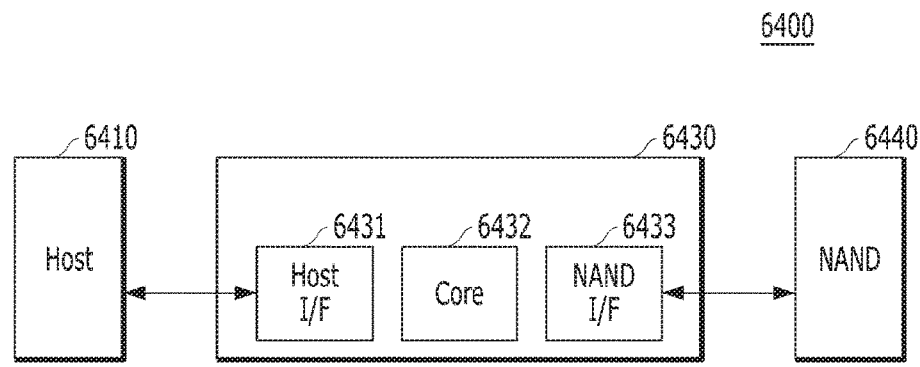
Figure 12:
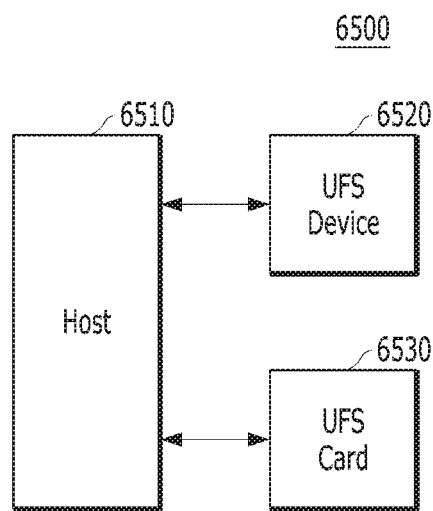
Figure 13:
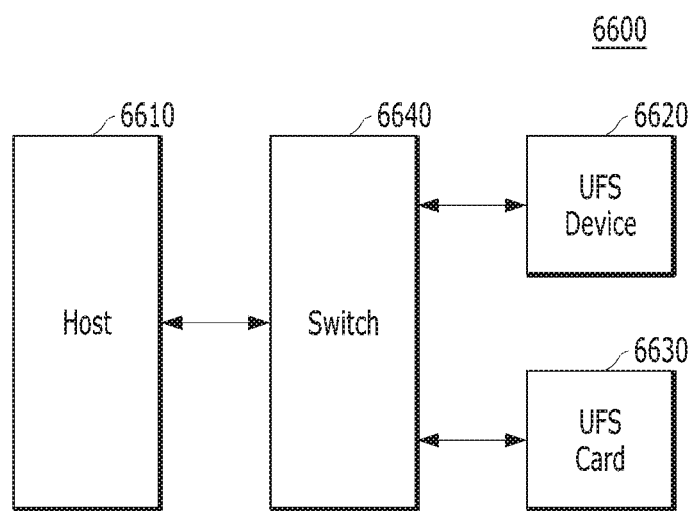
Figure 14:
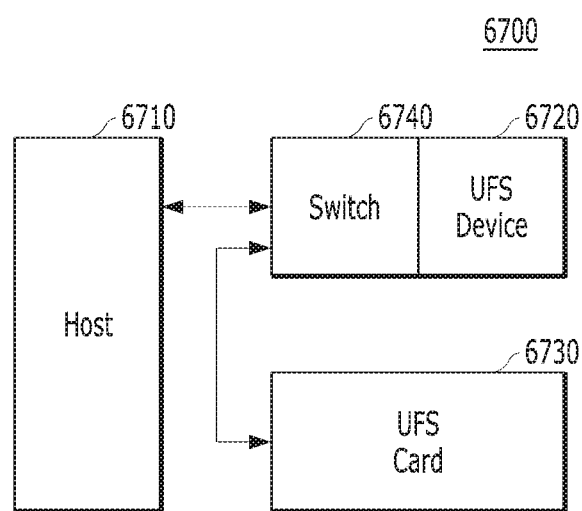
Figure 15:
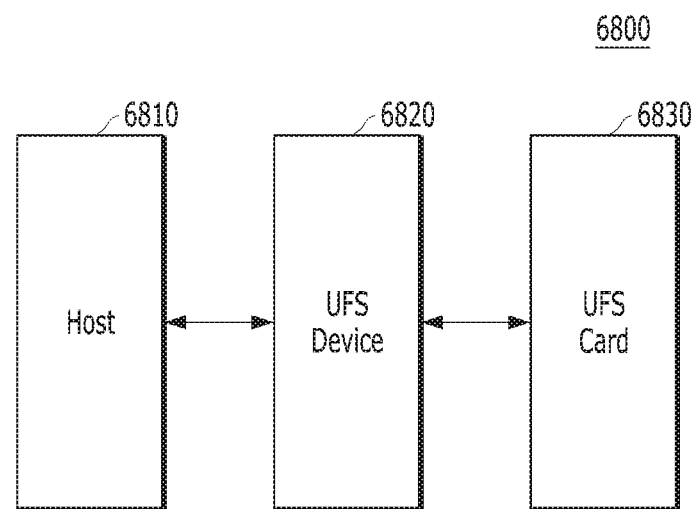

FIG. 11 is a diagram schematically illustrating an example of the data processing system including the memory system. FIG. 11 schematically illustrates an embedded Multi-Media Card (eMMC) to which the memory system may be applied.

Referring to FIG. 11, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface such as a NAND interface 6433.

The core 6432 may control the operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, e.g., UHS ((Ultra High Speed)-I/UHS-II) interface.

FIGS. 12 to 15 are diagrams schematically illustrating other examples of the data processing system including the memory system. FIGS. 12 to 15 schematically illustrate UFS (Universal Flash Storage) systems to which the memory system may be applied.

Referring to FIGS. 12 to 15, the UFS systems 6500, 6600, 6700 and 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices such as wired/wireless electronic devices, particularly mobile electronic devices, through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 9 to 11, and the UFS cards 6530, 6630, 6730, 6830 may be embodied in the form of the memory card system 6100 described with reference to FIG. 8.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface such as MIPI M-PHY and MIPI UniPro (Unified Protocol) in MIPI (Mobile Industry Processor Interface). Furthermore, the UFS devices 6520, 6620, 6720, 6820 and the UFS cards 6530, 6630, 6730, 6830 may communicate with each other through various protocols other than the UFS protocol, e.g., UFDs, MMC, SD, mini-SD, and micro-SD.

Figure 16:
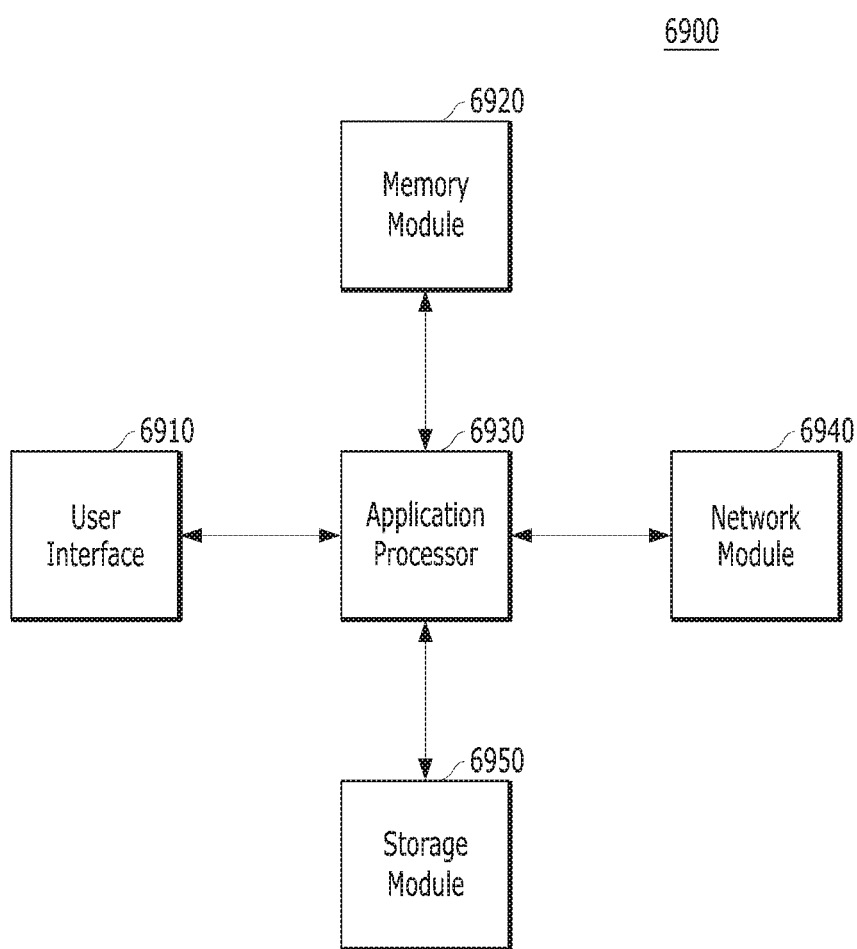

FIG. 16 is a diagram schematically illustrating another example of the data processing system including the memory system. FIG. 16 is a diagram schematically illustrating a user system to which the memory system may be applied.

Referring to FIG. 16, the user system 6900 may include an application processor 6930, a memory module 6920, a network module 6940, a storage module 6950 and a user interface 6910.

More specifically, the application processor 6930 may drive components included in the user system 6900 such as an OS, and include controllers, interfaces and a graphic engine which control the components included in the user system 6900. The application processor 6930 may be provided as a System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted based on POP (Package on Package).

The network module 6940 may communicate with external devices. For example, the network module 6940 may not only support wired communication, but may also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 10 to 15.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control the operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

While the present invention has been described with respect to specific embodiments, it will be apparent to those skilled in the art in light of this disclosure that various changes and modifications may be made without departing from the spirit and scope of the invention as defined in the following claims.

What is claimed is:

1. A memory system comprising:
   a memory device suitable for storing a plurality of map data; and
   a controller suitable for including a memory suitable for storing a location table identifying locations of target map data which is a target of the update among the plurality of map data,
   wherein the controller is configured to establish a plurality of indexes, one index for each of a plurality of map data, read the target map data from a memory block in the memory device based on the location table, generate a new index for target map data having no corresponding index, sort the target map data according to indexes, and store the sorted target map data into another memory block in the memory device.

2. The memory system of claim 1, wherein the controller is configured to check the plurality of indexes to generate the new index.

3. The memory system of claim 1, wherein the controller is further suitable for periodically updating the location data to reflect the one or more locations where the target map data is stored.

4. The memory system of claim 1, wherein the controller is further suitable for controlling the memory device to store valid map data, which is stored in a victim map block, into an open map block according to the index.

5. The memory system of claim 4, wherein the controller is further suitable for selecting, as the victim map block, a map block having a smaller number of valid pages, in which valid data is stored, than a threshold.

6. The memory system of claim 1, wherein the map data is in units of segments.

7. The memory system of claim 1, wherein the controller is suitable for establishing the indexes for the respective map data by units of memory blocks.

8. The memory system of claim 1, wherein the memory device includes a plurality of map blocks in which map data is stored, and a plurality of user blocks in which user data is stored.

9. An operating method of a memory system, the method comprising:
- establishing, using a controller, a plurality of indexes, one index for each of a plurality of map data;
- controlling a memory device to read stored target map data from the memory block in the memory device according to a location table identifying locations of target map data which is a target of the update among the plurality of map data; and
- generating a new index for target map data having no corresponding index;
- sorting the target map data according to indexes; and
- storing sorted target map data into another memory block in the memory device.

10. The method of claim 9, further comprising checking the plurality of indexes to generate the new index.

11. The method of claim 9, further comprising periodically updating the location data thereby reflecting the one or more locations where the target map data is stored.

12. The method of claim 9, further comprising controlling the memory device to store valid map data, which is stored in a victim map block, into an open map block according to the index.

13. The method of claim 12, further comprising selecting, as the victim map block, a map block having a smaller number of valid pages, in which valid data is stored, than a threshold.

14. The method of claim 9, wherein the map data is in units of segments.

15. The method of claim 9, wherein the index for the map data is in units of memory blocks.

16. The method of claim 9, wherein the memory device includes a plurality of map blocks in which map data is stored, and a plurality of user blocks in which user data is stored.

17. A memory system comprising:
- a memory device suitable for storing a plurality of map data and a location table identifying locations of the plurality of map data; and
- a controller suitable for generating indexes, each index corresponding to a respective one of the plurality of map data, and loading and updating at least one of the plurality of map data based on the indexes,
- wherein the controller is configured to use the indexes for sorting the plurality of map data and updating the location table, and to check the indexes for generating a new index for a map data having no corresponding index.

* * * * *